No. 885,445. PATENTED APR. 21, 1908.
J. R. CRENSHAW.
SPOKE PULLER.
APPLICATION FILED DEC. 9, 1907.
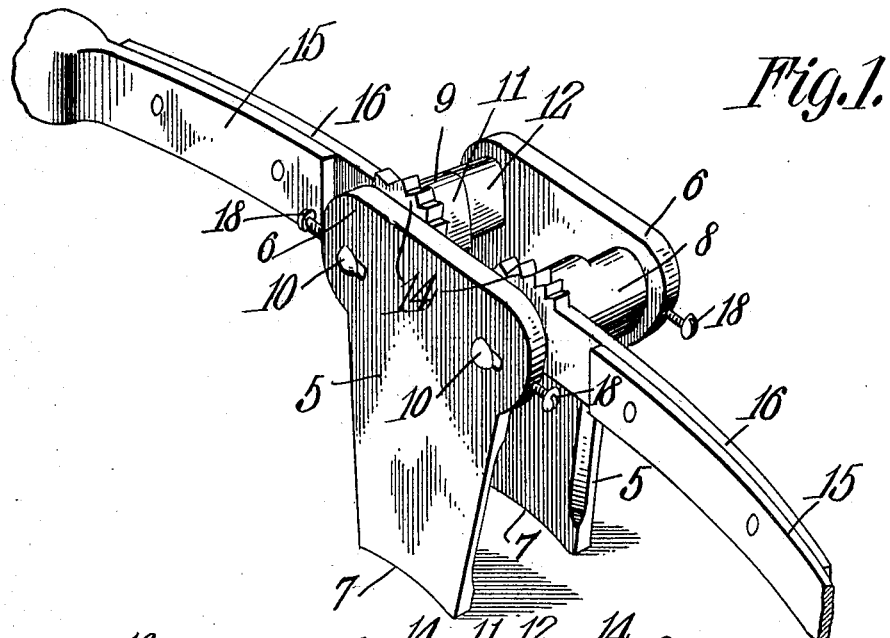
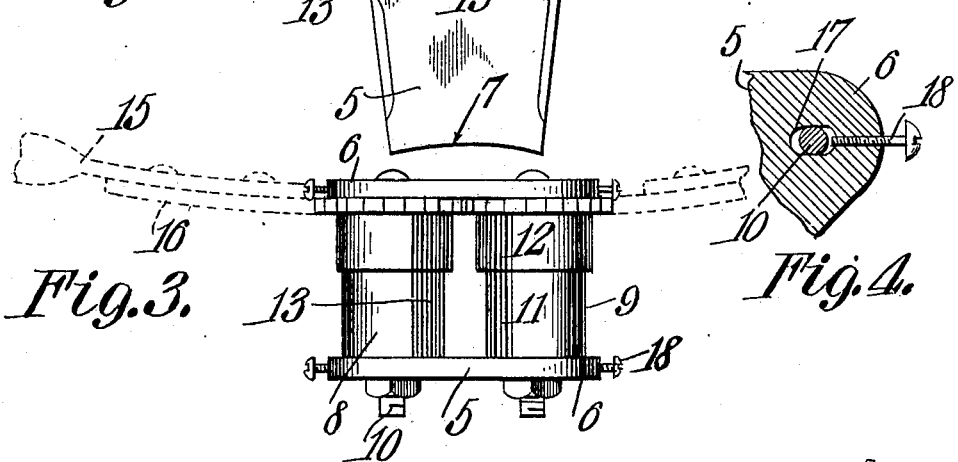
Inventor
Josiah R. Crenshaw,
Witnesses
By C. A. Snow & Co.
Attorneys

UNITED STATES PATENT OFFICE.

JOSIAH REAMES CRENSHAW, OF NEWBORN, GEORGIA.

SPOKE-PULLER.

No. 885,445.      Specification of Letters Patent.      Patented April 21, 1908.

Application filed December 9, 1907. Serial No. 405,779.

*To all whom it may concern:*

Be it known that I, JOSIAH REAMES CRENSHAW, a citizen of the United States, residing at Newborn, in the county of Newton and State of Georgia, have invented a new and useful Spoke-Puller, of which the following is a specification.

This invention relates to spoke pullers of that general class shown and described in my former application for patent filed June 25, 1907, Serial No. 380699.

The object of the invention is generally to improve the spoke puller and to adapt the same for extracting spokes of different thicknesses by allowing a limited lateral movement of the spoke engaging members between the side walls of the supporting frame.

A further object of the invention is to provide the spoke engaging members with inclined handle supporting shanks so as to prevent the handles from catching on the spokes of a wheel when the latter is dished or concaved.

A further object is to provide the spoke engaging members with integral segmental gears which intermesh and thus positively actuate both members when either handle is operated.

Further objects and advantages will appear in the following description, it being understood that various changes in form, proportions and minor details of construction may be resorted to within the scope of the appended claims.

In the accompanying drawings forming a part of this specification: Figure 1 is a perspective view of a spoke puller constructed in accordance with my invention. Fig. 2 is a longitudinal sectional view of the same. Fig. 3 is a top plan view, the handles being shown in dotted lines in inoperative position. Fig. 4 is a detail sectional view of a portion of the frame.

Similar numerals of reference indicate corresponding parts in all of the figures of the drawings.

The improved spoke puller forming the subject matter of the present invention includes a supporting frame comprising spaced side members 5 having their upper portions extended laterally at 6 and their lower ends provided with concaved bearing surfaces 7 adapted to bear against the exterior surface of the hub of a wheel, that portion of the side members between the extensions 6 and the concaved faces 7 being preferably inclined or beveled, as shown.

Interposed between the side members of the frame are spoke engaging members 8 and 9 which latter are substantially cylindrical in shape and mounted for rotation on suitable transverse pins or stub shafts 10 journaled in the side members 5.

The spoke engaging members 8 and 9 are provided with a plurality of flat bearing surfaces 11 and 12 arranged in spaced relation and adapted to register with each other to permit the insertion of a spoke between the same, each spoke engaging member being also provided with a plurality of longitudinal teeth or ribs 13 disposed adjacent each stepped bearing 11 and which bite into the adjacent walls of the spoke and prevent the latter from slipping when the device is operated to extract a spoke from the hub of a wheel.

Secured to or formed integral with one end of each spoke engaging member is a segmental gear 14 which meshes with the teeth of the adjacent gear so that when either operating handle 15 is depressed both spoke members will be actuated to grip the adjacent spoke.

Extending laterally from one side of each segmental gear 14 and preferably formed integral therewith is a shank 16 for attachment to the adjacent operating handle 15, said shanks being curved or deflected outwardly so as to permit the operating handles 15 to clear the adjacent spokes on a wheel when said wheel is of the dished or concaved type.

Formed in the uprights or side members 5 of the supporting frame are elongated slots 17 which constitute bearings for the pins 10 whereby said pins together with the spoke engaging members may be adjusted laterally of the supporting frame thereby to accommodate spokes of different thicknesses.

As a means for limiting the lateral movement of the spoke engaging members suitable screws 18 are threaded in the walls of the extension 6 with their inner ends disposed in the path of movement of the adjacent pins 10, as best shown in Fig. 4 of the drawings. It will thus be seen that by rotating the screws 18 the pins 10 may be adjusted longitudinally of the slots so as to force the teeth of the gears in engagement with each other when said teeth become worn from constant use.

In using the device for extracting a broken spoke the supporting frame is positioned over the stump of the spoke with the members 5 engaging the adjacent sides of the spoke and with the concaved faces 7 bearing against the exterior walls of the hub of the wheel. An initial downward movement is then imparted to the handle 15 which partly rotates the members 8 and 9 and causes the teeth or corrugations 13 to engage and bite into the adjacent walls of the spoke, a further downward movement of the handles causing the members to exert an upward pull on the spoke and thus effectually extract the same from its socket in the hub of the wheel, When the spaces between the flat bearing surfaces 11 and 12 of the spoke engaging members are too narrow to receive the spoke, said members may be adjusted laterally by rotating the screw 18 in the manner before described.

Attention is here called to the fact that the side members 5 by engagement with the adjacent walls of the spoke serve to lock the supporting frame against accidental displacement during the extracting operation, while the inclination of the shanks 16 prevent the operating handles from catcing or bearing against the adjacent spokes when the handles are actuated to extract a broken spoke.

From the foregoing description it will be seen that there is provided an extremely simple, inexpensive and efficient device admirably adapted for the attainment of the ends in view.

Having thus described the invention what is claimed is:

1. A spoke puller comprising a frame having elongated slots formed therein and constituting bearings, spoke engaging members journaled in said bearings and provided with inclined handle supporting shanks, said spoke engaging members each being provided with a plurality of stepped bearing surfaces and each having a roughened surface disposed adjacent each bearing surface, and means for limiting the lateral movement of the spoke engaging members.

2. A spoke puller comprising a frame having elongated slots formed therein and constituting bearings, spoke engaging members journaled in said bearings and provided with intermeshing teeth, said spoke engaging members each being provided with a plurality of stepped bearing surfaces and each having a roughened surface disposed adjacent each stepped bearing inclined handle supporting members extending laterally from the spoke engaging members, and adjusting screws threaded in the frame and bearing against the adjacent ends of the spoke engaging members for limiting the lateral movement thereof.

3. A spoke puller including a supporting frame comprising spaced uprights having their upper ends provided with lateral extensions and their lower ends formed with concaved bearing faces, there being elongated slots formed in the extensions of the side members, transverse pins journaled in said slots, spoke engaging members mounted for rotation on the pins and provided with intermeshing gears, said spoke engaging members each being provided with a plurality of stepped bearing surfaces and each having a roughened surface disposed adjacent each bearing surface, inclined handle supporting shanks extending laterally from the spoke engaging members, and screws threaded in the longitudinal edges of the extensions and bearings against the adjacent pins for limiting the lateral movement of said spoke engaging members.

4. A spoke puller including a supporting frame comprising spaced side members having their upper ends provided with lateral extensions and their lower ends formed with concaved bearing surfaces, the longitudinal edges of the side members between the extensions and concaved bearing surface being inclined downwardly, elongated slots formed in the extensions of the side members, pins journaled in said slots, spoke engaging members mounted for rotation on the pins and each provided with a plurality of flat bearing surfaces disposed in stepped relation, intermeshing gears formed on the spoke engaging members, inclined handle supporting shanks formed integral with and extending laterally from the gears, there being a roughened surface formed on each spoke engaging member adjacent each stepped bearing, and adjusting screws threaded in the walls of the extensions of the side members and bearing against the adjacent pins for limiting the lateral movement of the spoke engaging members.

In testimony that I claim the foregoing as my own, I have hereto affixed my signature in the presence of two witnesses.

JOSIAH REAMES CRENSHAW.

Witnesses:
 JAMES H. CARROLL,
 G. D. HEARD.